Jan. 15, 1929.  A. BLATZ, JR  1,698,987
MILKING MACHINE
Filed Feb. 6, 1926
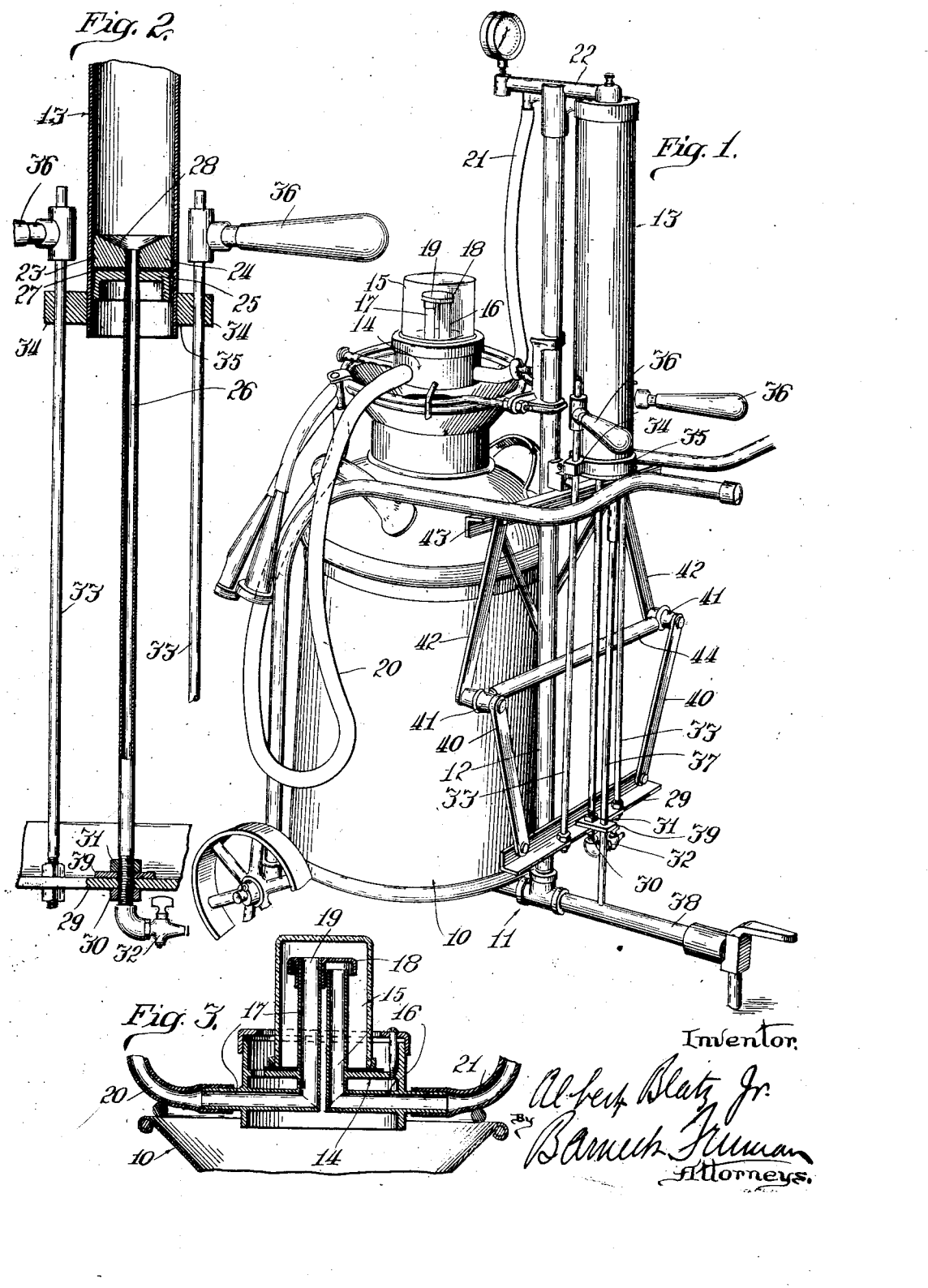

Patented Jan. 15, 1929.

1,698,987

UNITED STATES PATENT OFFICE.

ALBERT BLATZ, JR., OF MILWAUKEE, WISCONSIN, ASSIGNOR, BY MESNE ASSIGNMENTS, TO BURTON-PAGE COMPANY, A CORPORATION OF DELAWARE.

MILKING MACHINE.

Application filed February 6, 1926. Serial No. 86,513.

My invention relates to milking machines of the type involving the use of a reciprocating pump for creating a series of intermittent suction impulses that act to withdraw the milk from the cow. A milking machine of this type is diclosed in U. S. Patent 1,405,166 to W. A. Shippert, granted January 31, 1922, although it will be understood that the invention is not limited to application to this particular machine.

The object of the invention is to provide an improved construction for the pump of a milking machine of this general type, whereby milk that may be drawn into the pump through flooding of the milk chamber, or for other reasons, may be readily discharged therefrom; whereby the pump can be conveniently flushed to clean or disinfect it; and whereby any small quantity of milk that may be accidentally drawn into the pump, or milk vapor condensed therein, will be trapped, until such time as it can be discharged, so that it does not affect the lubrication of the pump and is not liable to be forced back into the milk chamber with consequent danger of contaminating the milk flowing therethrough.

The invention in a preferred embodiment is illustrated in the accompanying drawing, wherein Fig. 1 is a view in perspective of a milking machine of known type (Patent 1,405,166 above mentioned) provided with the improvement of my present invention;

Fig. 2 is a longitudinal sectional view of part of the vacuum pump constituting one of the elements of said milking machine; and Fig. 3 is a vertical sectional view of the milk chamber of the machine.

The milking machine as shown in Fig. 1 is, except for the added feature of my present invention, the same machine illustrated and described in U. S. Letters Patent 1,405,166 above mentioned. It will be necessary, therefore, to describe only such parts of the machine as come into play in connection with the improvements constituting the present invention.

Referring to the drawing, 10 designates a milk can which is supported on a wheeled structure 11, on the upright frame member 12 of which is a pump cylinder 13. Arranged on a base member 14, suitably supported over the mouth of the milk can, is a milk chamber 15, consisting of an inverted glass cup or vessel into which projects from the base member 14, an air exhaust pipe 16 and a milk inlet pipe 17, the former terminating under a shield plate 18 and the latter extending through said plate, as indicated at 19. Milk from the teat cups enters the milk inlet pipe 17 through flexible tube 20. The machine may, if desired, be equipped with two sets of teat cups for milking two cows simultaneonsly. The air exhaust pipe 16 is connected by flexible tube 21 with a tubular member 22 leading into the top of the pump cylinder 13.

Within the pump cylinder 13 is a piston 23, made in two sections 24 and 25 which have threaded bores and are screwed upon the end of the hollow piston rod 26. Between the piston sections is a cup 27 of leather or other suitable material. The upper surface of the upper section 24 is concave or conical, as indicated at 28. The piston rod extends through a cross head 29 and is threaded for the nuts 30, 31 by which it is attached to the cross-head. At the lower end of the piston rod is a drain cock 32.

Secured to the cross-head 29 are a pair of rods 33—33, which pass, slidably, through guiding lugs 34—34 on a collar 35 to which cylinder 13 is secured and are provided at their upper ends with handles 36. 37 is a guide rod extending between the horizontal frame member 38 and the collar 35, this guide rod being engaged by an apertured plate 39 on the cross-head 29. Pivoted to the cross-head 29 are a pair of links 40—40, the upper ends of which are articulated as indicated at 41 with links 42—42 pivoted to a cross member 43 fixed to the frame of the machine. 44 is a coiled spring which extends between the articulations 41—41.

The downward movement of the piston 23 produces a vacuum in cylinder 13 which exhausts the air from the milk chamber 15, the air from the chamber passing out through pipe 16 and flexible tube 21, as a result of which milk flows from the teat cups through flexible tube 20 and milk inlet pipe 17 into the chamber. The operation of drawing the vacuum is accomplished by depressing handles 36 to the position shown in the drawing. The operation is assisted by coiled spring 44 which has been expanded during the previous back or up stroke. On the back stroke, a part of the air in the cylinder, such as there may be, may escape past the piston. However, the back stroke of the piston produces a certain pressure in the milk chamber sufficient to tilt the vessel 15, thereby allowing the milk to be discharged into the milk can.

It will be observed that with the intended operation of the machine the milk does not enter the pump. It flows from the cow to the milk chamber and from the milk chamber into the can 10. However, if the milk should rise to too high a level in the milk chamber, it may flow into air pipe 16 and in any case some milk may be splashed into the air line or milk vapors may be drawn into the pump through the air line and condensed in the pump. If this occurred, with the machine as heretofore constructed, the milk was likely to be splashed around in the pump interfering with the proper lubrication of the piston and with the possibility that the milk thus contaminated might be forced back into the milk chamber. To provide against this contingency the piston rod, according to my improvement, is made hollow and provided with the draw-off cock 32. Any milk that may enter the pump drains down through the piston into the hollow piston rod, the piston being for this purpose preferably made concave on its upper surface. The milk collected in the piston rod may be drawn off by opening the cock 32. Moreover when the machine is to be cleaned, water, which may contain a disinfectant, can be forced through the machine, including the pump cylinder, by reciprocating the pump plunger and when the washing is complete or during the washing operation the water may be drained out by opening cock 32.

As changes in the construction shown and described may be made without departures from the principle of the invention, I deside it understood as claiming all modifications within the scope of the appended claims.

I claim:

1. An air pump for a milking machine comprising a cylinder, a piston, a hollow piston rod extending through the piston and providing a well for draining liquid from the cylinder and a valve for draining the liquid from the space within said piston rod.

2. An air pump for a milking machine comprising a cylinder, a piston, the inner face of which is concave, a hollow piston rod extending into the concavity of the piston and a valve for draining fluid from the space within said piston rod.

3. An air pump for a milking machine comprising a vertically arranged cylinder, a piston in said cylinder, and a piston rod extending through the lower end of the cylinder and connected with the piston, said piston rod being formed with a valve controlled duct for discharging the liquid from the space in the cylinder above the piston.

4. An air pump for a milking machine comprising a vertically arranged cylinder, a piston in said cylinder, the upper face of which is concave, a piston rod having a duct therein leading from the low point of the piston concavity and a draw-off cock at the lower end of said duct.

5. An air pump for a milking machine comprising a cylinder, a piston in the cylinder, and means associated with the piston providing ducts for collecting and discharging liquid from the cylinder.

ALBERT BLATZ, Jr.